Patented Apr. 29, 1952

2,594,803

UNITED STATES PATENT OFFICE 2,594,803

METHOD OF DYEING CELLULOSIC FIBERS WITH DIFFICULTLY WATER - SOLUBLE COPPER COMPOUNDS OF DYESTUFFS USING A COPPER-FREE DYESTUFF, AN ALIPHATIC AMINE, AND A COMPLEX COPPER COMPOUND OF AN ALIPHATIC HYDROXYCARBOXYLIC ACID

Henri Riat, Walter Anderau, Jacques Wegmann, Hans Mayer, and Karl Menzi, Basel, Switzerland, assignors to Ciba Limited, Basel, Switzerland, a Swiss firm No Drawing. Application September 29, 1949, Serial No. 118,714. In Switzerland October 8, 1948

7 Claims. (Cl. 8—42)

This invention relates to improvements in dyeing with complex copper compounds.

The invention is based on the observation that valuable dyeings can be produced with difficultly water-soluble copper compounds of dyestuffs when dyebaths are employed for the production of which there are used the metal-free dyestuffs forming the basis for the copper compounds, bases which owe their basic character to a nitrogen atom, and copper compounds.

As dyestuffs to be employed according to the present process those azo-dyestuffs are primarily of value which in the copper-free condition are soluble in water and are suitable for the dyeing of cellulosic materials, but which with copper salts in the absence of organic bases give difficultly soluble complex copper compounds which, on account of this property, are not well suited to dyeing purposes, at all events when the intention is to avoid dyeing from a suspension, which method as a rule leads to unsatisfactory results.

Those dyestuffs are of advantage for dyeing according to the present process which contain in the molecule at least two azo groups and at least once the atom grouping

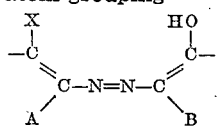

wherein X indicates a carboxyl group or a hydroxyl group, and wherein A represents an aromatic or heterocyclic radical, of which radicals the carbon atoms shown form part of the ring structure. Among dyestuffs of this constitution those are of special value, for example, which contain the just mentioned atom grouping twice and in symmetrical form, as for example those having the atom grouping

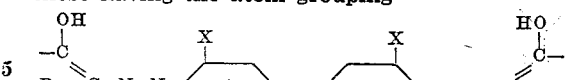

wherein X indicates a carboxyl or hydroxyl group and Y a bridge member, as for example

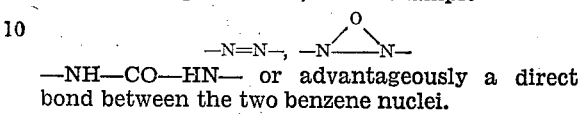

—NH—CO—HN— or advantageously a direct bond between the two benzene nuclei.

Valuable results are also obtained according to the present process with dyestuffs which contain the atom grouping

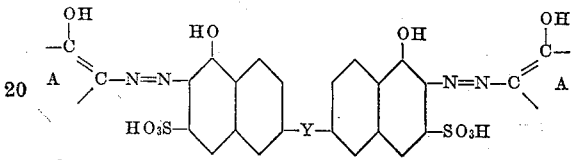

wherein Y indicates a nitrogen-containing bridge member; and further also with dyestuffs which exhibit the atom grouping

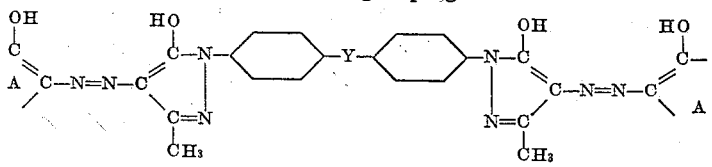

wherein Y indicates a direct bond between the two benzene nuclei or a bridge member, as for example —CH=CH—, and wherein the benzene nuclei may also contain substituents, for example sulfonic acid groups.

As examples of dyestuffs which are especially suitable for dyeing according to the present process there may be mentioned those of the following formulae:

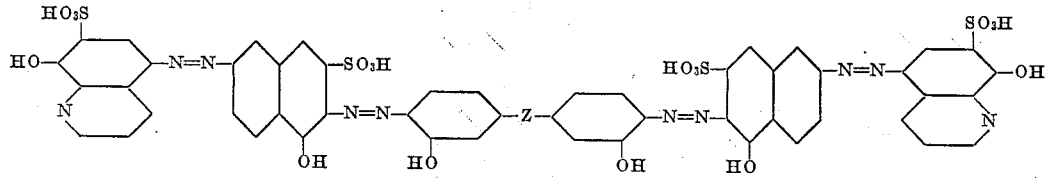

(wherein Z stands for —N=N— or

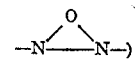

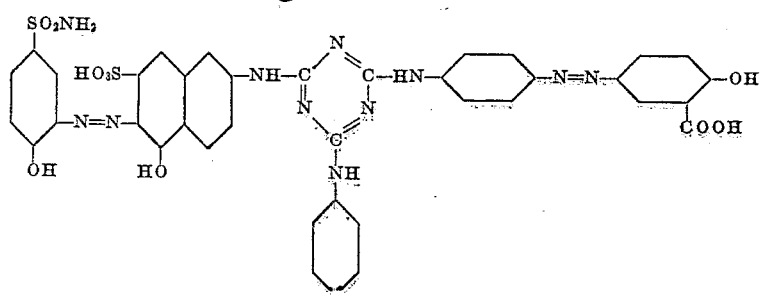
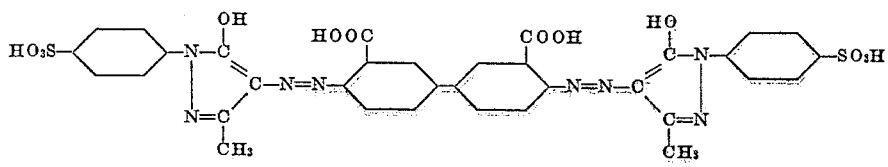
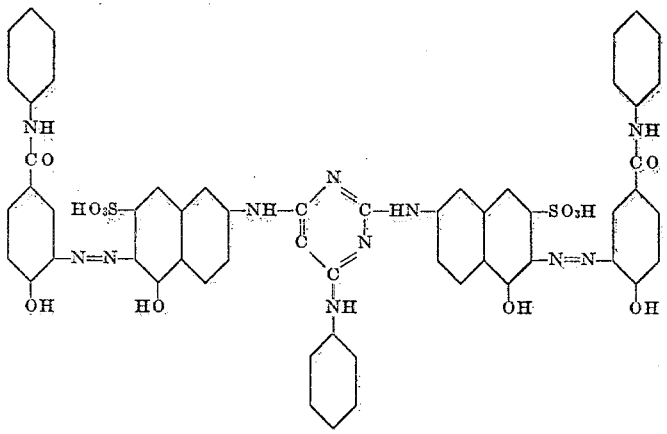
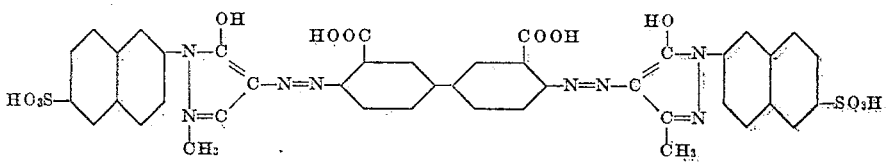
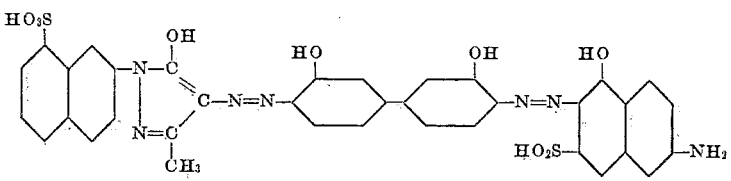
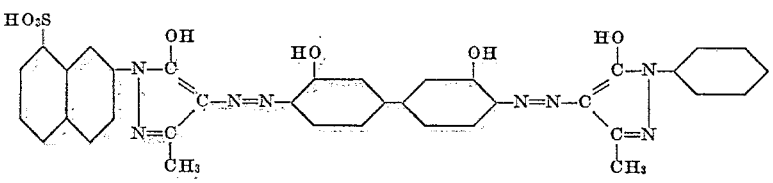
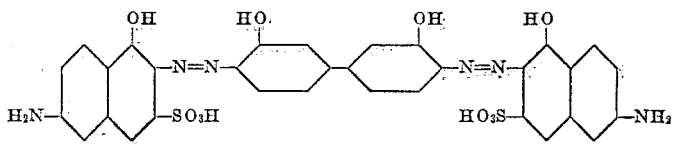
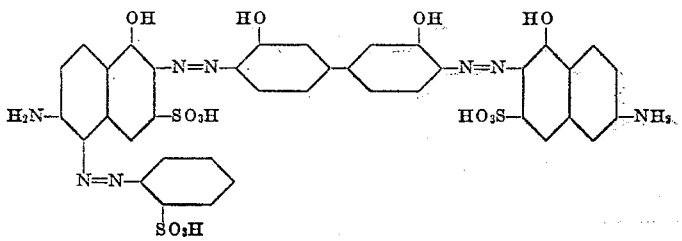

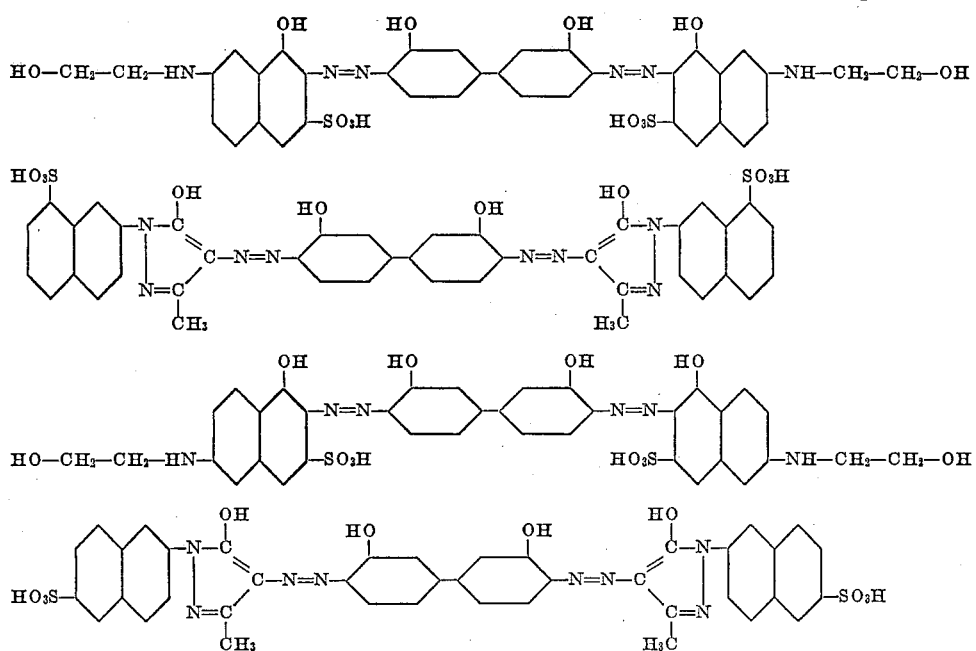

For preparation of the dyebaths according to the present process ammonia or water-soluble organic bases are employed. For this purpose such water-soluble bases are primarily suitable as cannot be removed with steam, such as aliphatic amines containing hydroxyl groups. As examples of bases there may be mentioned: methylamine, ethylamine, n-propylamine, n-butylamine, n-amylamine, cyclohexylamine, ethylene-diamine, α-amino-β-diethylamino-ethane, diethylamine, mono-ethanolamine, diethanolamine, triethanolamine, propanolamines, butanolamines, n-butyl-ethanolamine, morpholine and oxyethylmorpholine. Also two or more different bases may be employed at the same time.

As agents yielding copper which are employed according to the present process for the production of dyebaths, there come into consideration for example copper salts. When simply constituted copper salts are employed, as for example the sulfate, nitrate or acetate, it is in general of advantage to add to the dyebath, as well as the copper salts, further suitable additions which during the dyeing have the capacity for dispersing any copper hydroxide produced. An example of such an addition is the sodium salt of N-methyl-μ-heptadecyl-benzimidazole sulfonic acid.

With advantage such copper compounds are employed for the preparation of the dyebaths, as contain the copper combined in a complex form in the anion. The complex formers, which produce such complex copper compounds, possess in general the property which is advantageous in the present process that they do not withdraw the copper from complex copper compounds of dyestuffs. As examples of such complex formers there may be mentioned: aliphatic amino-carboxylic acids such as glycocoll or alanine, aliphatic hydroxy-carboxylic acids such as glycollic acid, lactic acid, β-hydroxy-propionic acid, β-hydroxy-butyric acid, tartaric acid, citric acid.

Instead of adding to the dyebaths the specified copper compounds which contain the copper in complex combination in the anion, in the already formed condition, these compounds can also be produced in the dyebath itself by adding to the latter, for example, on the one hand a copper salt such as copper chloride, sulfate, nitrate, formate or acetate and on the other hand a complex former which is capable of binding this metal in the anion in a complex manner, for example an alkali salt of an aliphatic amino-carboxylic acid or hydroxy-carboxylic acid.

In the preparation of the dyebaths it is suitable to proceed in such a manner that the compound containing copper is added after, or at the earliest at the same time as, the addition is made of the ammonia or the organic base to the dyebath containing the copper-free dyestuff. Accordingly, for example, the following methods of operation are suitable: The copper-free dyestuff is first dissolved either in the dyebath itself or in a little water, the concentrated solution being added to the dyebath, thereupon ammonia or an organic base is added and finally the copper compound (for example sodium-copper-tartrate) containing the copper combined in the anion in complex form; or alternatively there is added to the dyebath which contains the copper-free dyestuff dissolved therein, an aqueous solution consisting of ammonia or the organic base, a copper salt (for example copper sulfate) and a complex former which is capable of binding this metal in the anion in complex form (for example sodium citrate); or alternatively there is added to the dyebath which contains the copper-free dyestuff dissolved therein, a solution of ammonia or the organic base and a compound containing the copper combined in the anion in complex form (for example sodium-copper-tartrate). The solutions to be employed according to both of the latter methods of operation can be produced as stock solutions ready for use, if desired for storage. In this form they constitute valuable preparations suitable for the production of dyebaths.

The quantity of the dyestuff to be employed in the present process can be varied within wide limits and can be adapted to the desired strength of the dyeing. The quantity of the ammonia or the organic base is suitably such that at least as much of the base is present, or better somewhat more, than is necessary for the formation of the amine complex of the copper. Of the compound which contains the copper there is added with advantage an excess over that quantity which is necessary for the formation of the dyestuff-copper complex, which contains per metallisable group one atom of copper in complex combination. When for the preparation of the dyebaths copper salts and complex formers, which are capable of binding the copper in the anion in complex form, are employed, it is to be recommended likewise to employ an excess of such complex formers over the quantity necessary for the formation of the complex containing the copper in the anion.

In the present process such materials for dyeing are primarily concerned as do not require an acid dyebath but can be dyed from a neutral or advantageously from an alkaline medium, that is to say cellulosic materials such as linen, cotton and artificial silk or staple fiber from regenerated cellulose. In this case the dyeing can be carried out according to the customary known methods for direct-dyeing cellulose dyestuffs, for example with the addition of sodium carbonate and/or sodium sulfate. The bath ratio, i. e. the ratio of the quantity of material to be dyed to the quantity of dye liquor, is in this process capable of variation within wide limits and can to a far reaching extent be adapted to the requirements of practice. This single-bath and one-stage process gives in the case of the dyestuffs to be employed according to the present invention, very uniform and powerful dyeings, which as regards fastness properties at least equal those dyeings which are obtained with the corresponding metal-free dyestuffs with the application of the known after-coppering processes.

Compared with these known processes, as for example the two-bath after-coppering process with copper sulfate or the one-bath after-coppering process described in U. S. Patent No. 2,148,659, the present process exhibits the advantage that the duration of the dyeing process is considerably shortened and that it provides the dyer with a much better control of the dyeing operation and facilitates dyeing to a particular shade.

In U. S. Patent No. 2,092,429 a process is described in accordance with which products, which may perhaps be considered to be complex compounds of copper-containing dyestuffs and organic bases, are produced and are employed for dyeing. According to the methods of operation described in this prior patent the dyestuffs are always present in the dyebath in a dispersed form and there are always obtained dyeings which are weaker than those which are produced according to the present process.

The following examples illustrate the invention, the parts being by weight unless otherwise stated and the relation between parts by weight and parts by volume being the same as that between the kilogram and liter. Where in the preparation of dyebaths and stocks solutions "water" is mentioned this is to be understood as meaning so called condensed water (distilled water obtained from live steam).

Example 1

1 part of the dyestuff from 1 mol of tetrazotised 4:4' - diaminodiphenyl - 3:3' - dicarboxylic acid and 2 mols of 1-(4'-sulfo)-phenyl-3-methyl-5-pyrazolone is treated with 100 parts of hot water and the whole boiled. By dilution of the stock solution thus obtained with 2900 parts of water at about 60° C. there is produced a dyebath to which in addition 2 parts of anhydrous sodium carbonate are added.

60 parts by volume are added to the dyebath, of a solution prepared from 50 parts of crystalline copper sulfate, 50 parts of sodium citrate and 100 parts of monoethanolamine and which has been diluted with water to 1000 parts by volume. Then 100 parts of wetted-out cotton are entered and the bath temperature is raised within ½ hour to 100° C. Boiling is carried out for ¾ hour during which, after 5 and after 20 minutes boiling, in each case 20 parts of crystalline sodium sulfate are added. After this time the dyebath is effectively exhausted. The dyeing is subjected to a cold rinse, in which operation it is advantageous to add to the last rinsing bath 1 part of the condensation product which is obtained when dicyandiamidine is heated for about 10 minutes to 100° C. with four times the quantity of 30 per cent. commercial formaldehyde, the dyeing being allowed to remain in this bath for 5 minutes. The dye material is then hydro-extracted and dried. An orange dyeing is obtained of good fastness to light and washing.

If there is employed for the production of the above mentioned solution from copper sulfate and ethanolamine instead of the 50 parts of sodium citrate 30 parts of sodium glycocollate or 50 parts of sodium tartrate, similar results are obtained. The dyeings thus obtained are, both from the point of view of colour strength and also of fastness properties, at least as good as a dyeing obtained according to one of the known after-coppering processes. If the same dyeing operation is carried out without addition of base, a considerably weaker dyeing results, and if the addition of sodium citrate, sodium glycocollate or sodium tartrate is omitted, the dyeing may easily become spotted.

A valuable green dyeing is obtained when 100 parts of cotton are dyed, in the manner specified, instead of with the above mentioned dyestuff with 1 part of the dyestuff of the formula

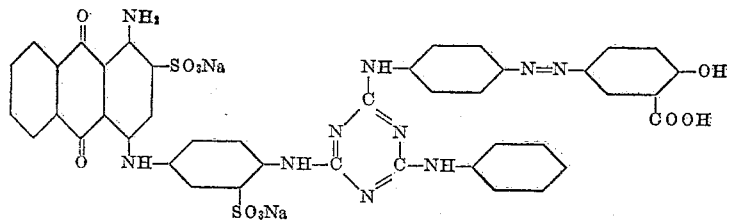

Example 2

1 part of the dyestuff from 1 mol of tetrazotised 4:4' - diaminodiphenyl - 3:3' - dicarboxylic acid and 2 mols of 1-(6'-sulfo-2'-naphthyl)-3-methyl-5-pyrazolone is dissolved in 100 parts of water and by dilution a dyebath of 3000 parts by volume produced, to which a further addition is made of 2 parts of anhydrous sodium carbonate.

60 parts by volume are added to the dyebath, of a solution which has been prepared from 100 parts of sodium-copper-tartrate, 200 parts of monoethanolamine and 1800 parts of water and 100 parts of wetted-out cotton are entered at about 50–60° C. The whole is heated to boiling within ½ hour and dyeing at the boil effected during ¾ hour, in which operation, after 5 and after 20 minutes, in each case 20 parts of crystalline sodium sulfate are added. After this time the bath is effectively exhausted and there results a full orange dyeing of good fastness to washing and light.

If there is employed 1 part of the dyestuff from 1 mol of tetrazotised 3:3'-dihydroxy-4:4'-diaminodiphenyl, 1 mol of 1-(8'-sulfo-2'-naphthyl)-3-methyl-5-pyrazolone and 1 mol of 1-phenyl-3-methyl-5-pyrazolone, there is obtained according to the above directions a powerful bordeaux dyeing of good fastness to light and washing, while with 1 part of the dyestuff from 1 mol of tetrazotised 3:3'-dihydroxy-4:4'-diaminodiphenyl, 1 mol of 2-amino-5-hydroxynaphthalene-7-sulfonic acid and 1 mol of 1-(8'-sulfo-2'-naphthyl)-3-methyl-5-pyrazolone, violet shades likewise of good fastness properties result.

Example 3

1 part of the dyestuff of the formula

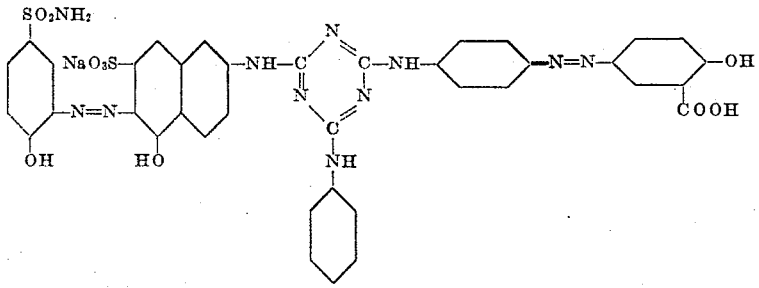

is dissolved in 100 parts of water and added to a dyebath from 2900 parts of water and 2 parts of anhydrous sodium carbonate. 60 parts of the complex copper salt solution described in Example 2 are added, 100 parts of wetted-out cotton are entered at 60° C. and dyeing is carried out as described in Example 2. The bath is effectively exhausted and there results a pure reddish brown dyeing of excellent fastness to washing and light.

If there is employed 1 part of the dyestuff of the formula

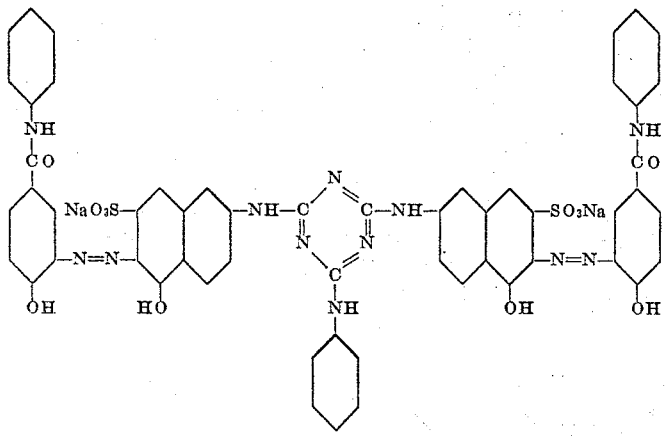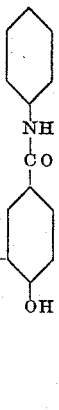

there is obtained according to the above process a pure ruby, likewise of excellent fastness to washing and light.

Example 4

A dyebath is produced from 2900 parts of water, 2 parts of anhydrous sodium carbonate and a solution of 1 part of the dyestuff obtained from 1 mol of tetrazotised 3:3'-dihydroxy-4:4'-diaminodiphenyl and 2 mols of 1-(6'-sulfo-2'-naphthyl)-3-methyl-5-pyrazolone in 100 parts of water and 60 parts are added of a solution which has been produced from 50 parts of sodium-copper-tartrate, 100 parts of ethylene diamine and 900 parts of water. 100 parts of wetted-out cotton are entered at about 60° C. and dyeing is carried out at the boil for ¾ hour after the temperature has been raised to 100° C. within ½ hour. After 5 and after 20 minutes boiling, in each case 20 parts of crystalline sodium sulfate are added. A full, brownish bordeaux dyeing is obtained of good fastness to washing and light. The same result is also obtained when, instead of 100 parts of ethylene diamine, 100 parts of monoethanolamine are employed.

Example 5

1 part of the dyestuff from 1 mol of tetrazotised 3:3'-dihydroxy-4:4'-diaminodiphenyl and 2 mols of 2-amino-5-hydroxynaphthalene-7-sulfonic acid is dissolved in 100 parts of water. By dilution of this solution to a volume of 3000 parts and addition of 2 parts of anhydrous sodium carbonate, a dyebath is produced to which the further addition is made of 60 parts of a solution which has been prepared from 50 parts of crystalline copper sulfate, 50 parts of sodium tartrate, 100 parts of concentrated ammonia (24 per cent.) and 900 parts of water.

100 parts of wetted-out cotton are entered at a bath temperature of about 60° C. and heating to boiling carried out within ½ hour. Within the boiling period of ¾ hour there are added, after 5 and after 20 minutes, in each case 20 parts of crystalline sodium sulfate. The bath is practically exhausted. The dyeing is subjected to a cold rinse in which in the last rinsing bath with advantage 1 part is added to the condensation product which is obtained when dicyandiamidine is heated for about 10 minutes to 100° C. with four times the quantity of 30 per cent. commercial formaldehyde. The resulting pure reddish blue dyeing exhibits good fastness to washing and light. If there is employed instead of the sodium tartrate for example 3 parts of the sodium salt of N-methyl-μ-heptadecyl-benzimidazole sulfonic acid (prepared from commercial stearic acid) and the process is otherwise conducted in the same way, similar results are obtained.

*Example 6*

1 part of the dyestuff from 1 mol of tetrazotised 3:3'-dihydroxy-4:4'-diaminodiphenyl and 2 mols of 2-β-hydroxyethylamino-5-hydroxynaphthalene-7-sulfonic acid is dissolved in 100 parts of water and added to a dyebath of 2900 parts of water. The further addition is made of 2 parts of anhydrous sodium carbonate and 60 parts of a solution consisting of 50 parts of copper tartrate, 100 parts of monoethanolamine and 900 parts of water and 100 parts of wetted-out cotton are entered at about 60° C. The bath temperature is raised within ½ hour to boiling and dyeing carried out at the boil for ¾ hour, during which time, after 5 and after 20 minutes, in each case 20 parts of crystalline sodium sulphate are added. After this time the bath is completely exhausted and the resulting pure greenish blue exhibits an excellent fastness to washing and light.

If the 100 parts of ethanolamine in the above process are replaced by 100 parts of concentrated ammonia (24 per cent.) or 100 parts of hydroxyethyl-isopropylamine, similar results are obtained.

If 1 part is employed of the dyestuff which is obtained from the disazo dyestuff of the formula

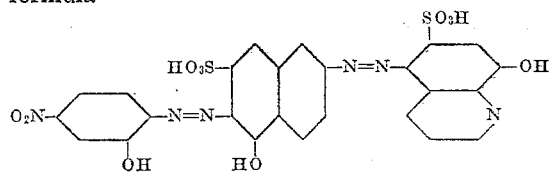

by reduction with glucose in alkaline solution and otherwise the process is conducted as above described, a very level bluish grey is obtained of good fastness to washing. Without thereby altering the result, the 50 parts of copper tartrate can be replaced by 50 parts of crystalline copper sulfate and 50 parts of sodium citrate or by 50 parts of crystalline copper sulfate and 30 parts of sodium glycocollate.

Having thus disclosed the invention, what is claimed is:

1. A process for dyeing undyed cellulosic textile fibers with difficultly water-soluble copper compounds of dyestuffs which comprises subjecting the said fibers to the action of a dyebath prepared essentially from a copper-free dyestuff forming the basis for the copper compound, a water soluble purely aliphatic amine and a complex copper compound of an aliphatic hydroxycarboxylic acid, the mixture of said complex copper compound and said aliphatic amine being stable in the dyebath during the dyeing process.

2. A process for dyeing undyed cellulosic textile fibers with difficultly water-soluble copper compounds of dyestuffs which comprises subjecting the said fibers to the action of a dyebath prepared essentially from a copper-free dyestuff forming the basis for the copper compound, a water soluble purely aliphatic amine which cannot be substantially removed from the dyebath with steam and a complex copper compound of an aliphatic hydroxycarboxylic acid, the mixture of said complex copper compound and said aliphatic amine being stable in the dyebath during the dyeing process.

3. A process for dyeing undyed cellulosic textile fibers with difficultly water-soluble copper compounds of dyestuffs which comprises subjecting the said fibers to the action of a dyebath prepared essentially from a copper-free dyestuff containing at least two azo groups and at least once the atom grouping

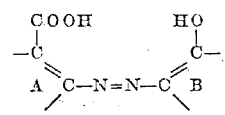

in which A represents an aromatic radical and B represents a cyclic radical, of which radicals the carbon atoms shown form part of the ring structure, a water-soluble purely aliphatic amine which cannot be substantially removed from the dyebath with steam and a complex copper compound of an aliphatic hydroxycarboxylic acid, the mixture of said complex copper compound and said aliphatic amine being stable in the dyebath during the dyeing process.

4. A process for dyeing undyed cellulosic textile fibers with difficultly water-soluble copper compounds of dyestuffs which comprises subjecting the said fibers to the action of a dyebath prepared essentially from a copper-free dyestuff containing at least two azo groups and at least once the atom grouping

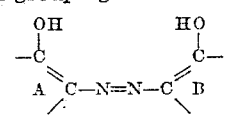

in which A represents an aromatic radical and B represents a cyclic radical, of which radicals the carbon atoms shown form part of the ring structure, a water-soluble purely aliphatic amine which cannot be substantially removed from the dyebath with steam and a complex copper compound of an aliphatic hydroxycarboxylic acid, the mixture of said complex copper compound and said aliphatic amine being stable in the dyebath during the dyeing process.

5. A process for dyeing undyed cellulosic textile fibers with difficultly water-soluble copper compounds of dyestuffs which comprises subjecting the said fibers to the action of a dyebath prepared essentially from the copper-free dyestuff of the formula

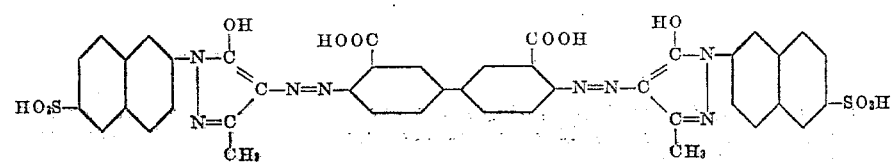

a water soluble purely aliphatic amine which cannot be substantially removed from the dyebath with steam and a complex copper compound of an aliphatic hydroxycarboxylic acid, the mixture of said complex copper compound and said aliphatic amine being stable in the dyebath during the dyeing process.

6. A process for dyeing undyed cellulosic textile fibers with difficultly water-soluble copper compounds of dyestuffs which comprises subjecting the said fibers to the action of a dyebath prepared essentially from the copper-free dyestuff of the formula

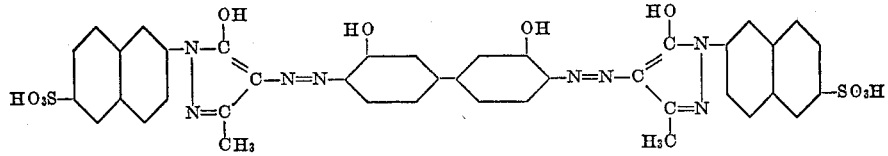

a water-soluble purely aliphatic amine which cannot be substantially removed from the dyebath with steam and a complex copper compound of an aliphatic hydroxycarboxylic acid, the mixture of said complex copper compound and said aliphatic amine being stable in the dyebath during the dyeing process.

7. A process for dyeing undyed cellulosic textile fibers with difficultly water-soluble copper compounds of dyestuffs which comprises subjecting the said fibers to the action of a dyebath prepared essentially from the copper-free dyestuff of the formula

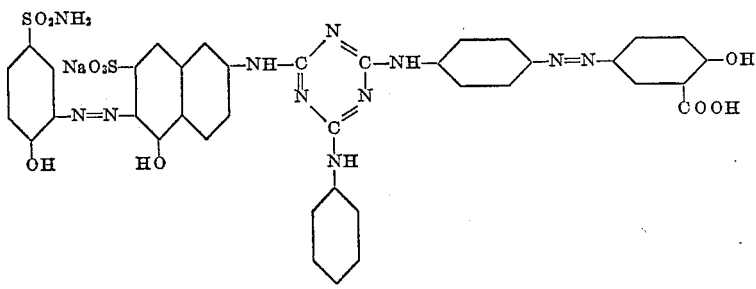

a water-soluble purely aliphatic amine which cannot be substantially removed from the dyebath with steam and a complex copper compound of an aliphatic hydroxycarboxylic acid, the mixture of said complex copper compound and said aliphatic amine being stable in the dyebath during the dyeing process.

HENRI RIAT.
WALTER ANDERAU.
JACQUES WEGMANN.
HANS MAYER.
KARL MENZI.

REFERENCES CITED

The following references are of record in the file of this patent:

UNITED STATES PATENTS

| Number | Name | Date |
| --- | --- | --- |
| 2,148,659 | Straub | Feb. 28, 1939 |
| 2,185,905 | Straub | Jan. 2, 1940 |